United States Patent
Komatsuzaki et al.

(10) Patent No.: US 11,879,975 B2
(45) Date of Patent: Jan. 23, 2024

(54) MEASUREMENT APPARATUS AND MEASUREMENT METHOD

(71) Applicant: Mitutoyo Corporation, Kawasaki (JP)

(72) Inventors: Shinji Komatsuzaki, Mito (JP); Yoshimasa Suzuki, Tsukuba (JP); Tomotaka Takahashi, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 148 days.

(21) Appl. No.: 17/397,850

(22) Filed: Aug. 9, 2021

(65) Prior Publication Data

US 2022/0057512 A1 Feb. 24, 2022

(30) Foreign Application Priority Data

Aug. 18, 2020 (JP) .................................. 2020-138140

(51) Int. Cl.
G01C 3/08 (2006.01)
G01S 17/34 (2020.01)
G01S 7/4912 (2020.01)
G01S 7/481 (2006.01)

(52) U.S. Cl.
CPC ............ G01S 17/34 (2020.01); G01S 7/4917 (2013.01); G01S 7/4818 (2013.01)

(58) Field of Classification Search
None
See application file for complete search history.

(56) References Cited

U.S. PATENT DOCUMENTS

| 10,969,491 B1* | 4/2021 | Krause Perin .......... G01S 17/42 |
| 11,255,969 B2* | 2/2022 | Komatsuzaki ........ G01S 7/4915 |
| 2021/0018604 A1* | 1/2021 | Barber .................... G01S 17/26 |

FOREIGN PATENT DOCUMENTS

| DE | 112019002401 T5 * | 1/2021 | ........... G01S 13/345 |
| JP | 3583906 B2 | 11/2004 | |

OTHER PUBLICATIONS

Takefumi Hara, "Distance Sensing by FSL Laser and Its Application", Optonews, vol. 7, No. 3, 2012, pp. 25-31 (with Partial English Translation).

* cited by examiner

*Primary Examiner* — Mark Hellner
(74) *Attorney, Agent, or Firm* — Oblon, McClelland, Maier & Neustadt, L.L.P.

(57) ABSTRACT

A measurement apparatus including: a laser that outputs a frequency-modulated laser beam; a branch that splits the frequency-modulated laser beam into a reference light and a measurement light; a beat signal generator that generates a beat signal by mixing the reference light and a reflected light that is reflected by radiating the measurement light onto an object to be measured; a frequency analyzer that frequency-analyzes the beat signal; a storage that stores a reference frequency signal which is a frequency signal obtained by converting a reference signal output by the beat signal generator in a state without the object to be measured; and calculation circuitry that calculates a difference between propagation distances of the reference light and the measurement light.

9 Claims, 9 Drawing Sheets

MEASUREMENT APPARATUS AND MEASUREMENT METHOD

CROSS-REFERENCE TO RELATED APPLICATIONS

The present application claims priority to Japanese Patent Application number 2020-138140, filed on Aug. 18, 2020. The contents of this application are incorporated herein by reference in their entirety.

BACKGROUND

A frequency-shifted feedback laser (FSFL) which is provided with a frequency shifter in a cavity (resonator) and outputs a plurality of longitudinal-mode lasers whose oscillation frequencies vary linearly with time is known. Also, an optical distance meter using such an FSFL is known (see, e.g., Patent Document 1, the Specification of Japanese Patent. No. 3583906, and Non-Patent Document 1, "Distance Sensing by FSF Laser and Its Application," by Takefumi HARA, Optonews, Vol. 7, No. 3, 2012, pp. 25-31).

An optical distance meter splits the frequency-shifted feedback laser into a reference light and a measurement light and generates a beat signal by mixing the reference light and a reflected light that is reflected by radiating the measurement light onto an object to be measured. Then, the optical distance meter measures a distance from the optical distance meter to the object to be measured by specifying a frequency of the beat signal. In such an optical distance meter, a reflected light may occur at an exit end that emits the measurement light toward the object to be measured. The reflected light occurring at the exit end might be mixed with the reference light to generate a beat signal, in a similar manner as with the reflected light of the measurement light. This may sometimes cause a reduction in measurement accuracy of the optical distance meter.

SUMMARY

The present disclosure has been made in view of this point, and its object is to suppress a reduction in measurement accuracy with a simple configuration even if a reflected light occurs at an exit end of a laser beam in an optical distance meter.

A first aspect of the present disclosure provides a measurement apparatus including: a laser apparatus that outputs a frequency-modulated laser beam; a branching part that splits the frequency-modulated laser beam output by the laser apparatus such that a portion of the frequency-modulated laser beam is a reference light and at least some of the remaining portion of the frequency-modulated laser beam is a measurement light; a beat signal generation part that generates a beat signal by mixing the reference light and a reflected light that is reflected by radiating the measurement light onto an object to be measured; a frequency analyzing part that performs a frequency analysis on the beat signal; a storage part that stores a reference frequency signal which is a reference signal output by the beat signal generation part in a state without the object to be measured and converted into a frequency signal; and a calculation part that calculates a difference between propagation distances of the reference light and the measurement light based on a result of the frequency analysis performed on the beat signal by the frequency analyzing part, wherein the frequency analyzing part subtracts a signal level of the reference frequency signal from a signal level of a frequency signal converted from the beat signal, for each frequency, and then specifies a frequency of the beat signal.

A second aspect of the present disclosure provides a measurement method of a measurement apparatus for measuring a distance to an object to be measured, the method including the steps of: outputting a frequency-modulated laser beam; splitting the frequency-modulated laser beam such that a portion of the frequency-modulated laser beam is a reference light and at least some of the remaining portion of the frequency-modulated laser beam is a measurement light; outputting, as a reference signal, a signal including a reference beat signal obtained by mixing the reference light and an end-face reflected light reflected from an exit end face that emits the measurement light in a state without the object to be measured; storing information obtained by converting the reference signal into a frequency signal, as a reference frequency signal; generating a plurality of beat signals by mixing the reference light and a reflected light that is reflected by radiating the measurement light onto the object to be measured; performing a frequency analysis on a frequency signal obtained by subtracting, for each frequency, a signal level of the reference frequency signal from a signal level of frequency signals which are converted from the beat signals into frequency domain signals; and calculating a difference between propagation distances of the reference light and the measurement light based on a result of the frequency analysis.

DETAILED DESCRIPTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Configuration Examples of a Measurement Apparatus 100]

Figure 1:
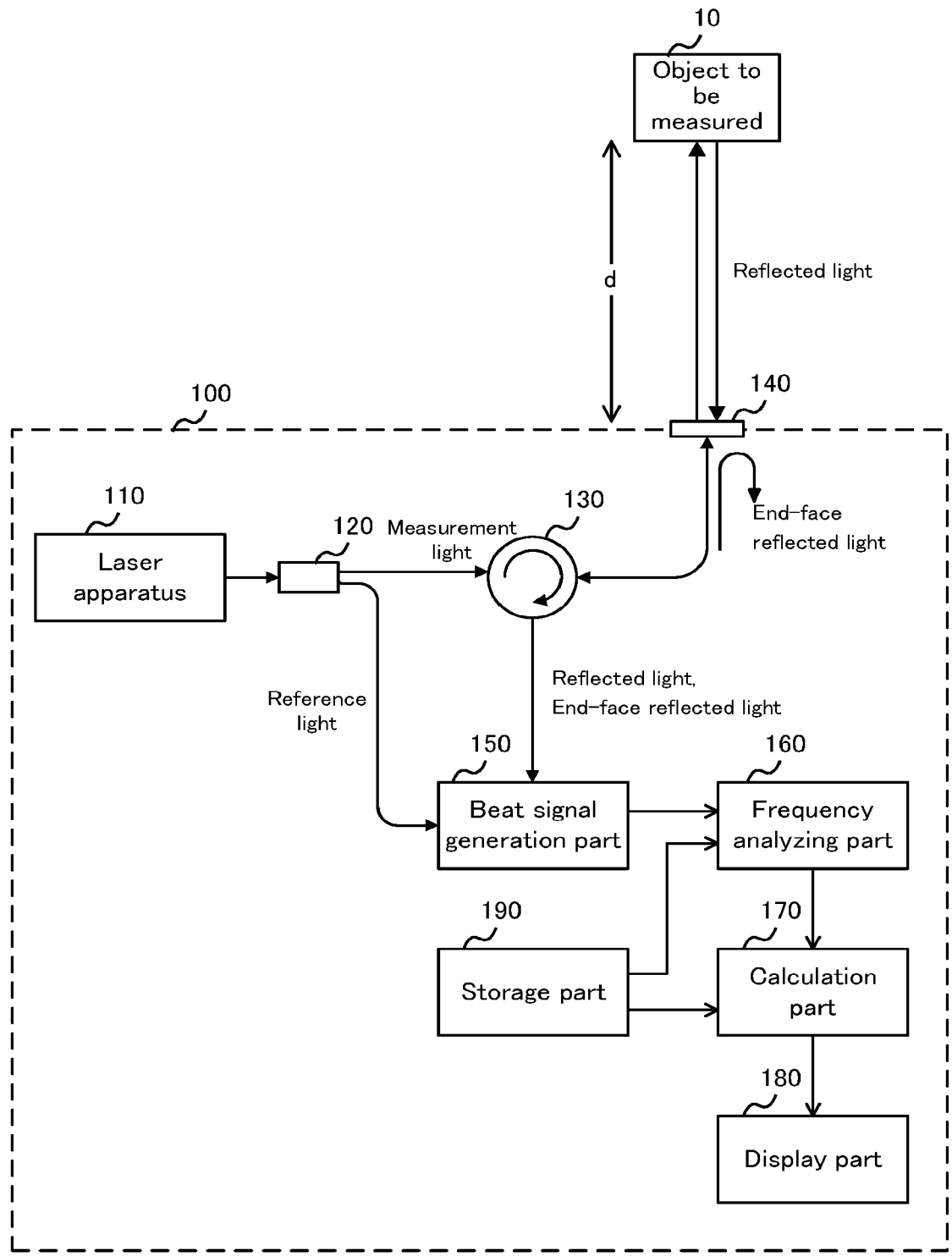
FIG. 1 shows a configuration example of a measurement apparatus 100 according to the present embodiment together with an object to be measured 10.

FIG. 1 shows a configuration example of a measurement apparatus 100 according to the present embodiment together with an object to be measured 10. The measurement apparatus 100 optically measures a distance between the measurement apparatus 100 and the object to be measured 10. Further, the measurement apparatus 100 may measure the three-dimensional shape of the object to be measured 10 by scanning a position of the laser beam radiated onto the object to be measured. The measurement apparatus 100 includes a laser apparatus 110, a branching part 120, an optical circulator 130, an optical head part 140, a beat signal generation part 150, a frequency analyzing part 160, a calculation part 170, a display part 180, and a storage part 190.

The laser apparatus 110 has an optical cavity (laser resonator) and outputs a frequency-modulated laser beam with a plurality of modes. The laser apparatus 110 is provided with a frequency shifter in a cavity (resonator), and outputs a plurality of longitudinal mode lasers whose oscillation frequencies change linearly with the passage of time. The laser apparatus 110 is a frequency-shifted feedback laser (FSFL), for example. The FSFL will be described later.

The branching part 120 splits the frequency-modulated laser beam output from the laser apparatus 110, with a portion of it as a reference light and at least some of the remaining portion of it as a measurement light. The branching part 120 is, for example, a one-in-two-out fiber optic coupler. In the example of FIG. 1, the branching part 120 supplies the measurement light to the optical circulator 130 and the reference light to the beat signal generation part 150.

The optical circulator 130 has a plurality of input/output ports. For example, the optical circulator 130 outputs a light, which is input from one port, to the next port, and further outputs a light, which is input from the next port, to the port after next. FIG. 1 shows an example in which the optical circulator 130 has three input/output ports. In this case, the optical circulator 130 outputs the measurement light supplied from the branching part 120 to the optical head part 140. Also, the optical circulator 130 outputs a light input from the optical head part 140 to the beat signal generation part 150.

The optical head part 140 radiates the light input from the optical circulator 130 toward the object to be measured 10. The optical head part 140 includes, for example, a collimator lens. In this case, the optical head part 140 first adjusts the light input from the optical circulator 130 via an optical fiber into a beam shape using a collimator lens, and then outputs the light.

Also, the optical head part 140 receives a reflected light of the measurement light radiated onto the object to be measured 10. The optical head part 140 focuses the received reflected light onto the optical fiber with a collimator lens and supplies it to the optical circulator 130. In this case, the optical head part 140 may include one common collimator lens, and the collimator lens may irradiate the object to be measured 10 with the measurement light and receive the reflected light from the object to be measured 10. The distance between the optical head part 140 and the object to be measured 10 is defined as d.

Alternatively, the optical head part 140 may include a focusing lens. In this case, the optical head part 140 focuses the light input from the optical circulator 130 via the optical fibers onto the surface of the object to be measured 10. The optical head part 140 receives at least a part of the reflected light reflected on the surface of the object to be measured 10. The optical head part 140 focuses the received reflected light onto an optical fiber using the focusing lens and supplies the light to the optical circulator 130. Also in this case, the optical head part 140 may include one common focusing lens, and the focusing lens may irradiate the object to be measured 10 with the measurement light and receive the reflected light from the object to be measured 10.

The beat signal generation part 150 receives, from the optical circulator 130, the reflected light that is reflected by radiating the measurement light onto an object to be measured 10. Also, the beat signal generation part 150 receives the reference light from the branching part 120. The beat signal generation part 150 mixes the reflected light and the reference light to generate a beat signal. The beat signal generation part 150 includes a photoelectric conversion element, for example, converts the beat signal into an electrical signal, and outputs the electrical signal.

Here, since the reflected light travels back and forth across the distance from the optical head part 140 to the object to be measured 10, a difference in a propagation distance corresponding to at least the distance 2d occurs as compared with the reference light. Since the oscillation frequency of the light output from the laser apparatus 110 changes linearly with the passage of time, a frequency difference, which is dependent on a propagation delay corresponding to the difference in the propagation distance, occurs between the oscillation frequency of the reference light and the oscillation frequency of the reflected light. The beat signal generation part 150 generates a beat signal corresponding to such a frequency difference.

The frequency analyzing part 160 performs a frequency analysis on the beat signal generated by the beat signal generation part 150. For example, the frequency analyzing part 160 converts the beat signal into a digital signal, and converts the converted digital signal into a frequency signal. Then, the frequency analyzing part 160 detects the frequency of the beat signal by analyzing the frequency signal generated by converting the beat signal to a frequency domain signal. Here, the frequencies of the beat signals are defined as $v_B$.

The calculation part 170 calculates a difference between propagation distances of the reference light and the measurement light, based on a result of the frequency analysis which the frequency analyzing part 160 performed on the beat signals. The calculation part 170 calculates the distance d from the optical head part 140 to the object to be measured 10 on the basis of the frequency $v_B$ of the beat signal. It is preferable that at least a part of the frequency analyzing part 160 and the calculation part 170 is formed by an integrated circuit or the like. At least a part of the frequency analyzing part 160 and the calculation part 170 includes, for example, a field programmable gate array (FPGA), a digital signal processor (DSP), and/or a central processing unit (CPU).

The display part 180 displays the calculation result of the calculation part 170. The display part 180 may include a display or the like and display the calculation result. Also, the display part 180 may store the calculation result in a storage part 190 or the like. The display part 180 may supply the calculation result to an external device via a network or the like.

The storage part 190 may store intermediate data, calculation results, set values, thresholds, parameters, and the like, which are generated or used in an operation process of the frequency analyzing part 160 and the calculation part 170. The storage part 190 may provide the stored data to a request source in response to a request from each part of the measurement apparatus 100.

The storage part 190 may store an operating system (OS) and various pieces of information such as programs which function as the frequency analyzing part 160 and the calculation part 170 when the CPU or the like operates as at least a part of the frequency analyzing part 160 and the calculation part 170. Also, the storage part 190 may store various types of information including a database to be referred to at the time of executing the programs. For example, a computer functions as the frequency analyzing part 160 and the calculation part 170 by executing the programs stored in the storage part 190.

The storage part 190 includes, for example a read only memory (ROM) storing a basic input output system (BIOS) or the like of a computer or the like, and a random access memory (RAM) serving as a work area. The storage part 190 may include a large-capacity storage device like a hard disk drive (HDD) and/or a solid state drive (SSD). Also, the computer may further include a graphics processing unit (GPU) or the like.

The measurement apparatus 100 described above can measure the distance d between the measurement apparatus 100 and the object to be measured 10 by analyzing the frequency difference between the reflected light of the measurement light radiated onto the object to be measured 10 and the reference light. That is, the measurement apparatus 100 can form a non-contact and non-destructive optical distance meter. Next, a more detailed configuration of the measurement apparatus 100 will be described.

[Configuration Example of the Laser Apparatus 110]

Figure 2:
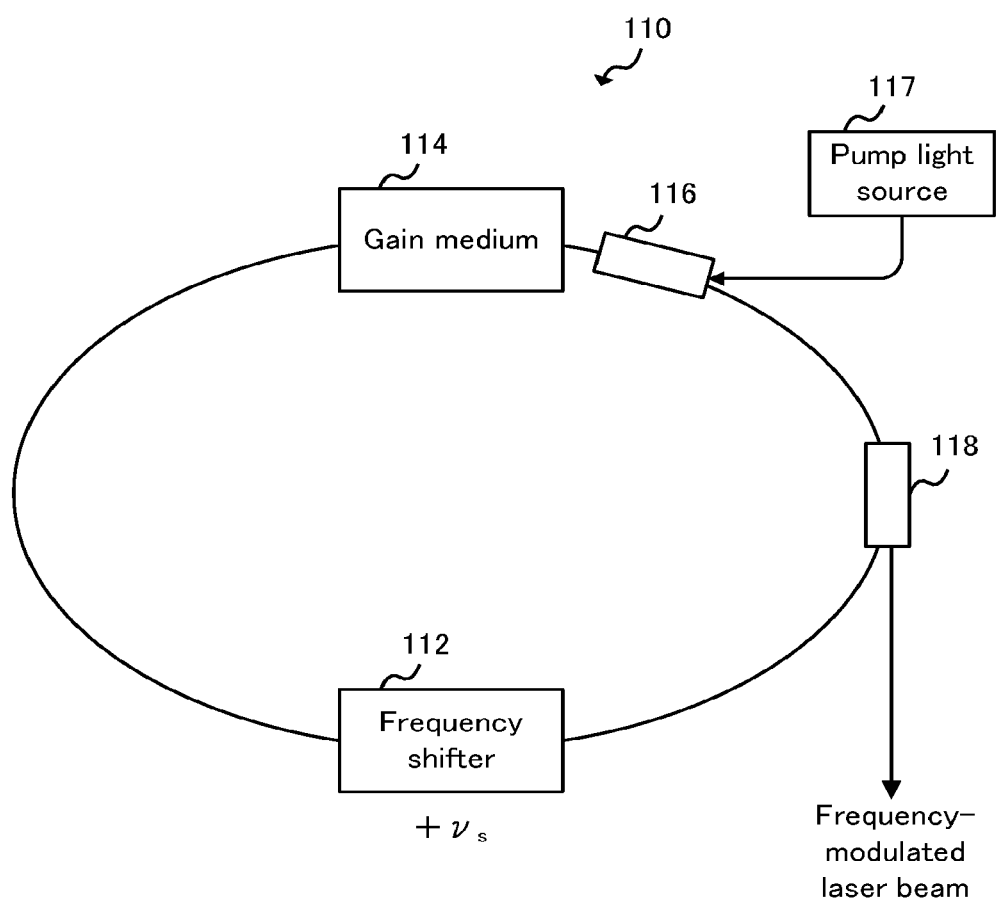
FIG. 2 shows a configuration example of a laser apparatus 110 according to the present embodiment.

FIG. 2 shows a configuration example of the laser apparatus 110 according to the present embodiment. The laser apparatus 110 of FIG. 2 shows an example of the FSFL. The laser apparatus 110 includes an optical cavity and oscillates a laser beam in the optical cavity. The optical cavity of the laser apparatus 110 includes a frequency shifter 112, a gain medium 114, a WDM coupler 116, a pump light source 117, and an output coupler 118.

The frequency shifter 112 shifts a frequency of a light to be input by an approximately constant frequency. The frequency shifter 112 is, for example, an acousto-optic frequency shifter (AOFS) having acousto-optic elements. Here, the amount of the frequency shift by the frequency shifter 112 is defined as $+v_s$. That is, the frequency shifter 112 shifts the frequency of the light circulating around the cavity to increase the frequency by $v_s$ for each round.

The gain medium 114 is supplied with a pump light and amplifies the input light. The gain medium 114 is, for example, an optical fiber doped with impurities. The impurities are, for example, rare earth elements such as erbium, neodymium, ytterbium, terbium, thulium, or the like. The gain medium 114 is supplied with the pump light from the pump light source 117 via the WDM coupler 116. The output coupler 118 outputs, to an external device, a part of the light that has been laser-oscillated in the cavity.

That is, the laser apparatus 110 shown in FIG. 2 contains a fiber ring laser having the frequency shifter 112 in the cavity. The laser apparatus 110 preferably further includes an isolator in the cavity. Also, the laser apparatus 110 may have an optical bandpass filter that passes light of a predetermined wavelength band in the cavity. Frequency characteristics of the laser beam output from the laser apparatus 110 will be described below.

Figure 3:
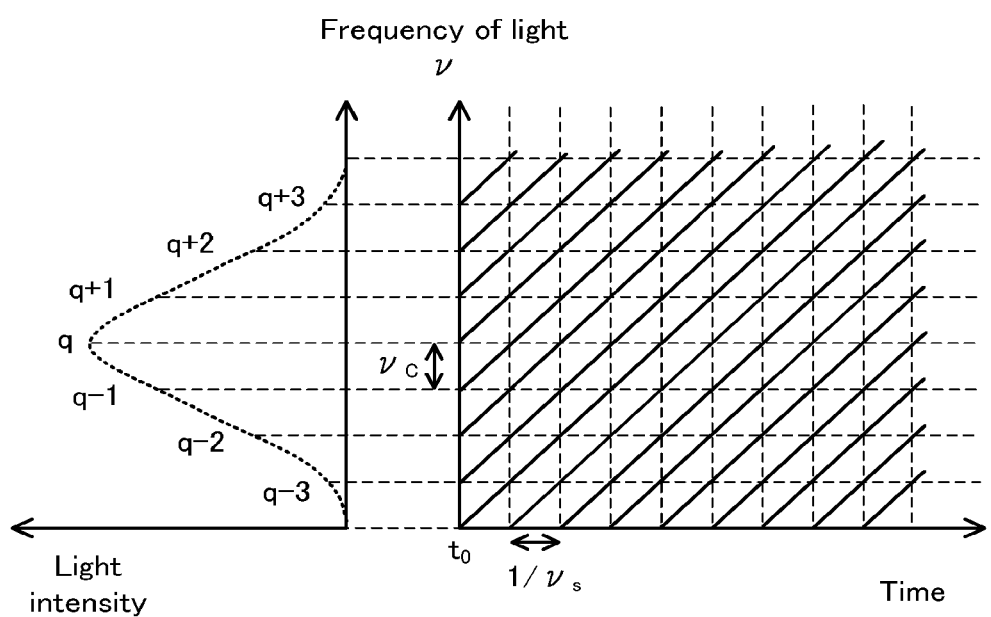
FIG. 3 shows an example of a laser beam output from the laser apparatus 110 according to the present embodiment.

FIG. 3 shows an example of the laser beam output from the laser apparatus 110 according to the present embodiment. FIG. 3 shows, on the left, a light spectrum of the laser beam output from the laser apparatus 110 at the time $t_0$. In the light spectrum, the horizontal axis indicates the light intensity, and the vertical axis indicates the frequency of the light. Also, a plurality of longitudinal modes of the light spectrum are denoted by the numbers q. The frequencies of the plurality of longitudinal modes are arranged at approximately constant frequency intervals. Supposing that $\tau_{RT}(=1/v_C)$ denotes the time for light to go around the cavity once, the plurality of longitudinal modes are arranged at intervals of $1/\tau_{RT}(=v_C)$, as represented by the following equation. It should be noted that $v_0$ is the initial frequency of the light spectrum at the time $t_0$. Also, $v_C$ is a cavity frequency (resonator frequency) $v_C$ of the optical cavity.

$$v_q(t_0) = v_0 + \frac{q}{\tau_{RT}} \quad \text{[Equation 1]}$$

FIG. 3 shows, on the right, changes in frequencies with the passage of time of the plurality of longitudinal modes output by the laser apparatus 110. On the right side of FIG. 3, the horizontal axis indicates the time and the vertical axis indicates the frequency. That is, FIG. 3 shows a change over time in the frequency of the laser beam output from the laser apparatus 110 on the right side, and shows an instantaneous frequency of the laser beam at the time to on the left side.

In the laser apparatus 110, each time the light in the cavity goes around the cavity, the frequency shifter 112 increases the frequency of the light traveling around the cavity by $v_S$. That is, since the frequency of each of the modes increases by $v_S$ for every passing of $\tau_{RT}$, the rate of change dv/dt of the frequency (i.e., chirp rate) becomes approximately equal to $v_S/\tau_{RT}$. Therefore, the plurality of longitudinal modes represented by Equation 2 change as shown in the following equation with the passage of the time t.

$$v_q(t) = v_0 + \frac{v_s}{\tau_{RT}}t + \frac{q}{\tau_{RT}} \quad \text{[Equation 2]}$$

[Details of a Distance Measurement Process]

The measurement apparatus 100 according to the present embodiment measures the distance d between the optical head part 140 and the object to be measured 10 by using the laser apparatus 110 that outputs the frequency elements represented by Equation 2. Suppose that an optical path difference between the reference light and the reflected light is only the distance 2d, which is the reciprocated distance d, and the propagation delay corresponding to the distance 2d is $\Delta t$. That is, when the measurement light is reflected and returned from the object to be measured 10 at the time t, the frequency of the returned reflected light approximately matches the past frequency that is a time $\Delta t$ earlier than the time t, and therefore can be expressed by the following equation.

$$v_q(t - \Delta t) = v_0 + \frac{v_s}{\tau_{RT}}(t - \Delta t) + \frac{q}{\tau_{RT}} \quad \text{[Equation 3]}$$

On the other hand, the reference light at the time t can be expressed by the following equation in a similar manner as with Equation 2, where the reference light is $v_q(t)$ $$v_{q'}(t) = v_0 + \frac{v_s}{\tau_{RT}}t + \frac{q'}{\tau_{RT}} \quad \text{[Equation 4]}$$

Because the beat signal generation part 150 superposes the reflected light and the reference light, a plurality of beat signals between the plurality of longitudinal modes expressed by Equation 3 and the plurality of longitudinal modes expressed by Equation 4 are generated. Supposing that the frequencies of such beat signals are $v_B(m, d)$, $v_B(m, d)$ can be expressed by the following equation from Equations 3 and 4. It should be noted that m is a difference of the longitudinal mode numbers (=q−q'), $\Delta t = 2d/c$, and c is the speed of light.

$$v_B(m, d) = v_{q'}(t) - v_q(t - \Delta t) = \frac{v_s}{\tau_{RT}} \cdot \frac{2d}{c} - \frac{m}{\tau_{RT}} \quad \text{[Equation 5]}$$

From Equation 5, the distance d is expressed by the following equation, where $1/\tau_{RT} = v_C$.

$$d = \frac{c}{2v_s v_c}\{v_B(m, d) + mv_c\} \quad \text{[Equation 6]}$$

From Equation 6, it can be understood that the distance d can be calculated from a frequency observation result of the beat signal by determining the difference m of the longitudinal mode numbers. It should be noted that the difference m can be determined by detecting a change in beat signals when the amount of frequency shift $v_s$ of the laser apparatus 110 is changed. Since such a method of determining the difference m is known, as described in Patent Document 1 or the like, its detailed description is omitted.

Since the observed beat signal is always a positive frequency, in calculation, the beat signal generated on the negative frequency side is folded back on the positive side and observed as an image signal. Next, the generation of such an image signal will be described.

Figure 4:
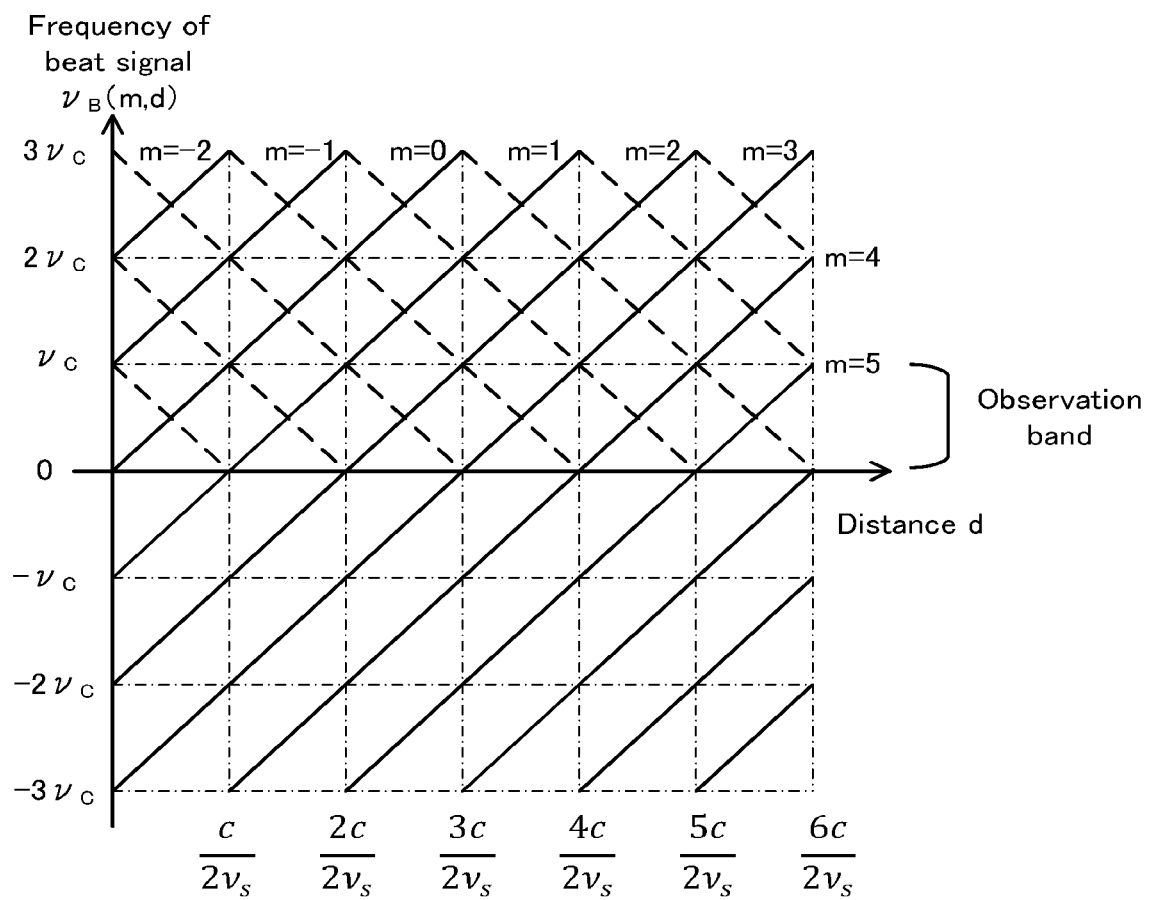
FIG. 4 shows an example of a relationship between (i) a frequency of the beat signal detected by the measurement apparatus 100 according to the present embodiment and (ii) a distance d between an optical head part 140 and the object to be measured 10.

FIG. 4 shows an example of the relationship between the frequency of the beat signal detected by measurement apparatus 100 according to the present embodiment and the distance d between the optical head part 140 and the object to be measured 10. In FIG. 4, the horizontal axis indicates the distance d, and the vertical axis indicates the frequency $v_B(m, d)$ of the beat signal. The plurality of straight lines shown by the solid lines in FIG. 4 are graphs showing the relation of the frequency $v_B(m, d)$ of the beat signal with respect to the distance d for each of the plurality of values of m, as shown in Equation 6.

As shown in FIG. 4, a plurality of beat signals corresponding to the value of m are generated. However, since the plurality of longitudinal modes included in each of the reflected light and the reference light are arranged at approximately constant frequency intervals $v_C$, a plurality of beat signals having equal values of m are superposed on approximately the same frequency on the frequency axis. For example, when a frequency band between frequencies 0 and $v_C$ is observed, a plurality of beat signals are superposed on approximately the same frequency and are observed as a single line spectrum.

In addition, the absolute value of the frequency $v_B(m, d)$ of the beat signal in the negative range smaller than 0 is further observed as the image signal. That is, the graph of the region in which the vertical axis of FIG. 4 is smaller than 0 is folded back, with a frequency 0 as a boundary. FIG. 4 shows the folded image signal with a plurality of dotted lines. Since only the positive and negative of the folded image signals are inverted, the image signals are superposed on the observed frequency axis at the same frequency as the absolute value of the frequency before being folded. For example, when a frequency band between frequencies 0 and $v_C$, is observed, the beat signal and the image signal are respectively located at different frequencies unless the frequencies of the beat signal and the image signal become $v_C/2$.

As described above, in the observation band between the frequencies 0 and $v_C$, two line spectra are generated, which are (i) the beat signal $v_B(m, d)$ and (ii) the image signal $v_B(m', d)$ whose value of m is different from that of the beat signal $v_B(m, d)$. Here, as an example, m'=m+1. In this case, the beat signal generation part 150 can cancel such an image signal by using quadrature detection. Next, the beat signal generation part 150 and the frequency analyzing part 160 using the quadrature detection will be described.

Figure 5:
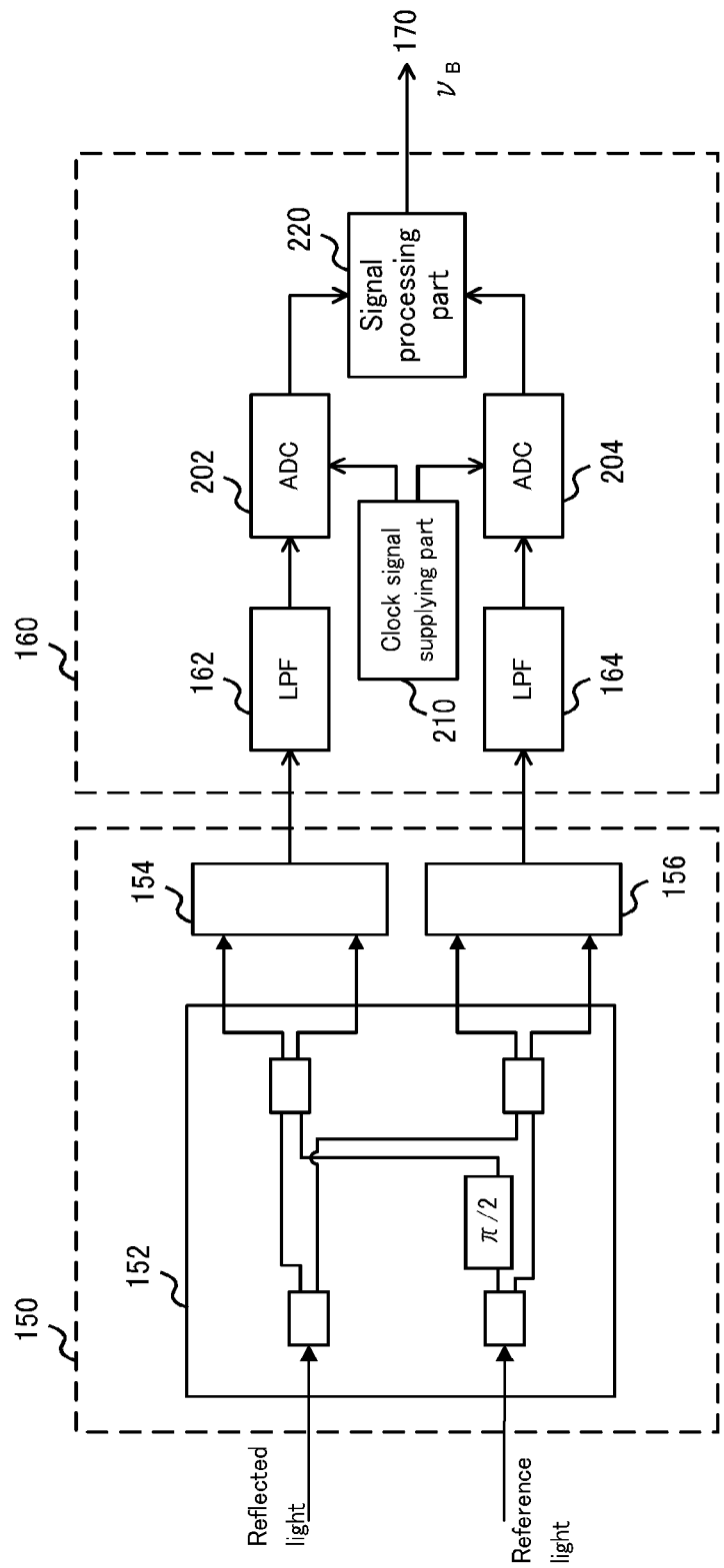
FIG. 5 shows a configuration example of a beat signal generation part 150 and a frequency analyzing part 160 according to the present embodiment.

FIG. 5 shows a configuration example of the beat signal generation part 150 and the frequency analyzing part 160 according to the present embodiment. The beat signal generation part 150 quadrature-detects the reflected light and the reference light. The beat signal generation part 150 includes an optical 90-degree hybrid 152, a first photoelectric conversion part 154, and a second photoelectric conversion part 156.

The optical 90-degree hybrid 152 splits each of the input reflected light and the input reference light into two. The optical 90-degree hybrid 152 multiplexes one of the split reflected lights and one of the split reference lights with an optical coupler or the like to generate the first beat signal. The optical 90-degree hybrid 152 multiplexes the other split reflected light and the other split reference light with the optical coupler or the like to generate the second beat signal. Here, the optical 90-degree hybrid 152 generates a beat signal after generating a phase difference of 90 degrees between the two split reference lights. For example, the optical 90-degree hybrid 152 multiplexes the split reflected light with one of the split reference light and multiplexes the split reflected light with a light generated by the other split reference light passing through a π/2 wavelength plate.

The first photoelectric conversion part 154 and the second photoelectric conversion part 156 receive the multiplexed reflected light and reference light and convert them into electrical signals. Each of the first photoelectric conversion part 154 and the second photoelectric conversion part 156 may be a photodiode or the like. Each of the first photoelectric conversion part 154 and the second photoelectric conversion part 156 is, for example, a balanced photodiode. In FIG. 5, suppose that the first photoelectric conversion part 154 generates a first beat signal and the second photoelectric conversion part 156 generates a second beat signal. As described above, the beat signal generation part 150 performs the quadrature detections by multiplexing two reference lights and two reflected lights having phases differing by 90 degrees, respectively, and outputs two beat signals to the frequency analyzing part 160.

The frequency analyzing part 160 performs a frequency analysis on the two beat signals. Here, an example in which the frequency analyzing part 160 performs the frequency analysis using the first beat signal as an I signal and the second beat signal as a Q signal, will be described. The frequency analyzing 160 includes a first filter part 162, a second filter part 164, a first AD converter 202, a second AD converter 204, a clock signal supplying part 210, and a signal processing part 220.

The first filter part 162 and the second filter part 164 reduce signal components in a frequency band differing from a frequency band that a user or the like wants to analyze. Here, the frequency band that the user or the like wants to analyze is set from 0 to $v_C$. The first filter part 162 and the second filter part 164 are, for example, low-pass filters that pass signal components having a frequency equal to or less than $v_C$. In this case, the first filter part 162 supplies the first beat signal obtained by reducing the signal components having a frequency higher than the frequency $v_C$ to the first AD converter 202. Also, the second filter part 164 supplies the second beat signal obtained by reducing the signal components having a frequency higher than the frequency $v_C$ to the second AD converter 204.

The first AD converter 202 and the second AD converter 204 convert analog signals into digital signals. For example, the first AD converter 202 converts the first beat signal into a digital signal, and the second AD converter 204 converts the second beat signal into a digital signal. The clock signal supplying part 210 supplies clock signals to the first AD converter 202 and the second AD converter 204. By doing this, the first AD converter 202 and the second AD converter 204 convert the analog signals into the digital signals at approximately the same sampling rate as a clock frequency of the received clock signal.

Here, when the observation band is from 0 to $v_C$, the frequency of the beat signals is at most the cavity frequency $v_C$ of the optical cavity. Therefore, the clock signal supplying part 210 supplies clock signals having a frequency greater than or equal to twice the cavity frequency $v_C$ of the optical cavity to the first AD converter 202 and the second AD converter 204, whereby the beat signals can be observed.

The signal processing part 220 converts the first beat signal and the second beat signal into frequency data. As an example, the signal processing part 220 performs a digital Fourier transform (DFT) on the first beat signal and the second beat signal. The signal processing part 220 adds the first beat signal converted into the frequency data as the real part and the second beat signal converted into the frequency data as the imaginary part, and cancels the image signal. It should be noted that after the beat signals are converted into the digital signals, the frequency analyzing part 160 may configure a signal processing part 220 using an integrated circuit or the like. The quadrature detection in the beat signal generation part 150 and the frequency analysis in the frequency analyzing part 160 will be described below.

Figure 6:
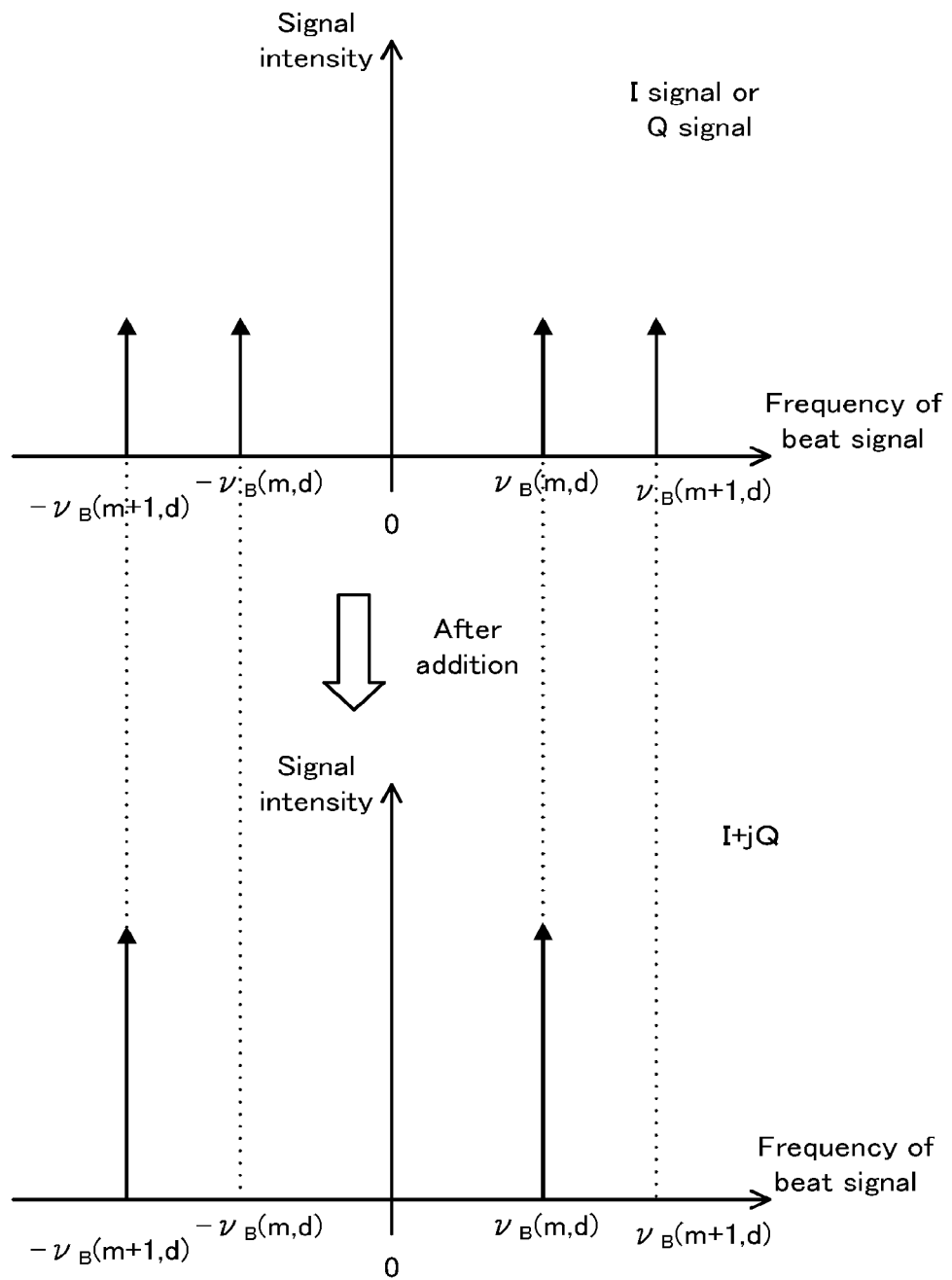
FIG. 6 shows an example of an outline of a quadrature detection by the beat signal generation part 150 and the frequency analyzing part 160 according to the present embodiment.

FIG. 6 shows an example of an outline of quadrature detection by the beat signal generation part 150 and the frequency analyzing part 160 according to the present embodiment. In FIG. 6, the horizontal axis indicates the frequency of the beat signal, and the vertical axis indicates the signal intensity. FIG. 6 shows a frequency spectrum of one of the I signal and the Q signal. The frequency spectra of both the I and Q signals have approximately the same spectral shape, as shown in the upper part of FIG. 6. In the I signal and the Q signal, for example, a beat signal $v_B(m, d)$ and an image signal $v_B(m+1, d)$ are observed in a frequency band between the frequencies 0 and $v_C$. In this case, in the I and Q signals, a beat signal $-v_B(m, d)$ and an original beat signal $-v_B(m+1, d)$ of the image signal exist in a frequency band between the frequencies 0 and $-v_C$ on the negative side.

Here, since the I signal and the Q signal are signal components being quadrature-detected by the beat signal generation part 150, they include different phase information even if the spectral shapes are the same. For example, in the frequency band between the frequencies 0 and $v_C$ on the positive side, phases of the image signal $v_B(m+1, d)$ of the I signal and the image signal $v_B(m+1, d)$ of the Q signal are mutually inverted. Similarly, in the frequency band between the frequencies 0 and $-v_C$ on the negative side, phases of the beat signal $-v_B(m, d)$ of the I signal and the beat signal $-v_B(m, d)$ of the Q signal are mutually inverted.

Therefore, as shown in the lower part of FIG. 6, when the signal processing part 220 calculates I+jQ using the I signal and the Q signal, the beat signals of the frequency $v_B(m, d)$ strengthen each other and the image signals of the frequency $v_B(m+1, d)$ cancel each other out in the frequency band between the frequencies 0 and $v_C$. Similarly, in the frequency band between the frequencies 0 and $-v_C$, the beat signals of the frequency $-v_B(m+1, d)$ strengthen each other and the beat signals of the frequency $-v_B(m, d)$ cancel each other out.

According to the frequency analysis result of the signal processing part 220, one beat signal is observed for the frequency $v_B(m, d)$ in the frequency band between the frequencies 0 and $v_C$. Since the measurement apparatus 100 can cancel out the image signal in this manner, the frequency $v_B(m, d)$ of the beat signal can be detected. For example, the signal processing part 220 outputs, as the frequency $v_B(m, d)$ of the beat signal, a frequency at which the signal intensity of the converted frequency domain signal is highest.

Here, the distance d measured by the measurement apparatus 100 is expressed by Equation 6. From Equation 6, it can be seen that the distance d can be calculated by using three frequencies $v_C$, $v_s$, and $v_B(m, d)$. It is understood that, among these three frequencies, $v_B(m, d)$ can be detected as described above. Also, since $v_C$ and $v_s$ are the frequencies determined based on components used in the laser apparatus 110, $v_C$ and $v_s$ can be treated as fixed values. Therefore, the calculation part 170 calculates the distance d by using the frequency $v_B(m, d)$ of the beat signal detected by the frequency analyzing part 160 and the predetermined frequencies $v_C$ and $v_s$. As described above, the measurement apparatus 100 can measure the distance d from the optical head part 140 to the object to be measured 10. Further, by adding an offset value corresponding to a reference position to the distance d, the measurement apparatus 100 may calculate and output a distance from the reference position to the object to be measured 10.

[Measurement Apparatus 100 which Reduces Influences of an End-Face Reflected Light]

The above measurement apparatus 100 radiates the measurement light from the optical head part 140 toward the object to be measured 10, and a reflected light may occur at an exit end face that emits the measurement light of the optical head part 140. For example, when a measurement light is emitted from an optical fiber, a reflected light may occur at an exit end face of the fiber. Further, when the optical head part 140 is emitting measurement light using an optical lens such as a collimator lens or focusing lens, reflected light may occur at the surface of the lens to which the measurement light is incident. In the present embodiment, such a reflected light is an end-face reflected light.

In a similar manner as with the reflected light that is reflected by radiating the measurement light onto the object to be measured 10, the end-face reflected light may generate a beat signal when mixed with the reference light. In this case, the beat signal generation part 150 generates two beat signals, among which one beat signal is due to the reflected light of the measurement light and the reference light and the other beat signal is due to the end-face reflected light and the reference light.

Figure 7:
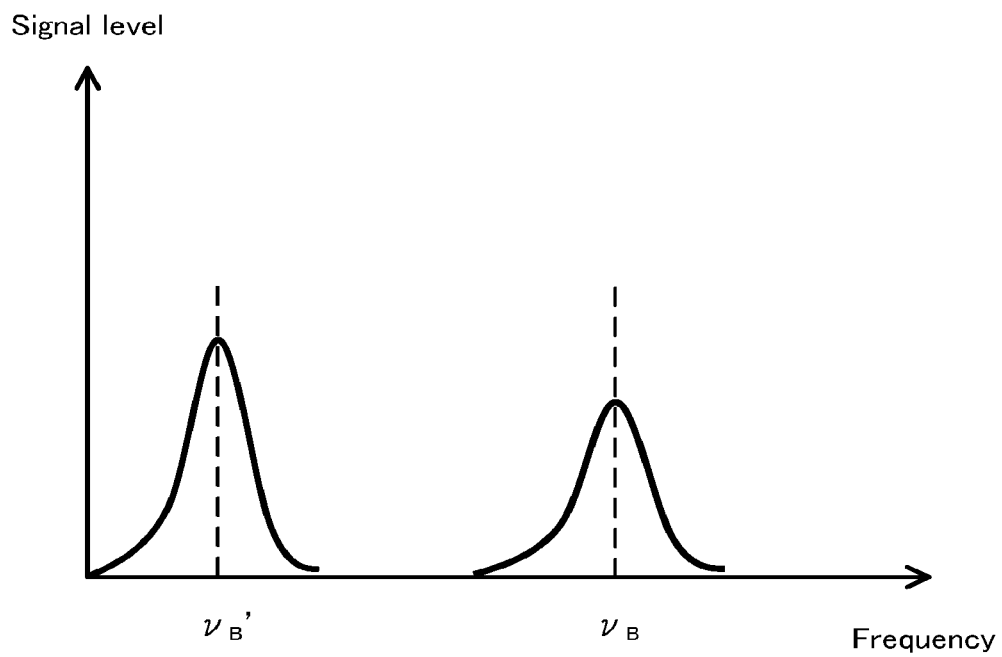
FIG. 7 shows an example of a frequency signal, which is a signal generated by the frequency analyzing part 160 according to the present embodiment by converting a beat signal generated by the beat signal generation part 150 to a frequency domain signal.

FIG. 7 shows an example of a frequency signal, which is a signal generated by the frequency analyzing part 160 according to the present embodiment by converting a beat signal generated by the beat signal generation part 150 into a frequency domain signal. FIG. 7 shows an example in which the beat signal generation part 150 generates two beat signals due to the end-face reflected light. In FIG. 7, the horizontal axis indicates the frequency and the vertical axis indicates the signal level. In the frequency signal, a frequency spectrum of the beat signal based on the end-face reflected light is superposed on a frequency spectrum of the beat signal based on the reflected light which is reflected on the object to be measured 10. Here, a peak frequency of the beat signal based on the reflected light which is reflected on the object to be measured 10 is denoted by $v_B$, and a peak frequency of the beat signal based on the end-face reflected light is denoted by $v_B'$. In the present embodiment, the frequency signal in which the two frequency spectra are superposed due to an occurrence of the end-face reflected light in this manner is a signal for measuring distance (a distance measurement signal).

When the frequency analyzing part 160 analyzes such a distance measurement signal, the beat signal $v_B'$ based on the end-face reflected light, among the two beat signals, may be processed as a beat signal to be analyzed. In this case, a distance to be calculated by the calculation part 170 differs from the distance d from the optical head part 140 to the object to be measured 10.

Also, in a frequency domain such as shown in FIG. 7, frequencies of the two beat signals may come close to the extent that peaks of the two frequency spectra cannot be separated, for example. In this case, even if the frequency analyzing part 160 analyzes such beat signals, the frequency $v_B(m, d)$ of the beat signal based on the reflected light that is reflected on the object to be measured 10 cannot be accurately output.

Therefore, the measurement apparatus 100 according to the present embodiment enables suppressing of a reduction in measurement accuracy with a simple configuration even if the end-face reflected light occurs at the laser beam exit end. Such a function of the measurement apparatus 100 can be realized by adding certain operations to be performed by the frequency analyzing part 160 and the storage part 190 to the operations described using FIG. 1 to FIG. 6, for example.

Here, the measurement apparatus 100 outputs, from the optical head part 140, a frequency-modulated laser beam for measuring a distance and uses, as a reference signal, a signal output by the beat signal generation part 150 in a state without the object to be measured 10. The state without the object to be measured 10 is, for example, a state before the object to be measured 10 is installed, a state where the object to be measured 10 is removed, a state where the frequency-modulated laser beam is radiated in a direction different from a direction in which the object to be measured 10 is disposed, or the like. In other words, the state without the object to be measured 10 is a state where the laser apparatus 110 is outputting the frequency-modulated laser beam but the optical head part 140 is not receiving a reflected light reflected from the object to be measured 10.

When the end-face reflected light has occurred in this case, even without the object to be measured 10, the beat signal generation part 150 generates a beat signal by mixing the reference light and the end-face reflected light reflected from the exit end face that emits the measurement light. The beat signal based on such an end-face reflected light is used as a reference beat signal. Then, the beat signal generation part 150 outputs a signal including the reference beat signal as the reference signal.

The storage part 190 stores a reference frequency signal that is the reference signal output by the beat signal generation part 150 in the state without the object to be measured 10 and converted into a frequency signal by the frequency analyzing part 160. It is preferable that the storage part 190 stores the reference frequency signal in advance. Alternatively, the storage part 190 may store a reference frequency signal that is converted when the reference signal is generated after the measurement apparatus 100 performed the distance measurement for the object to be measured 10 and the object to be measured 10 is removed.

Figure 8:
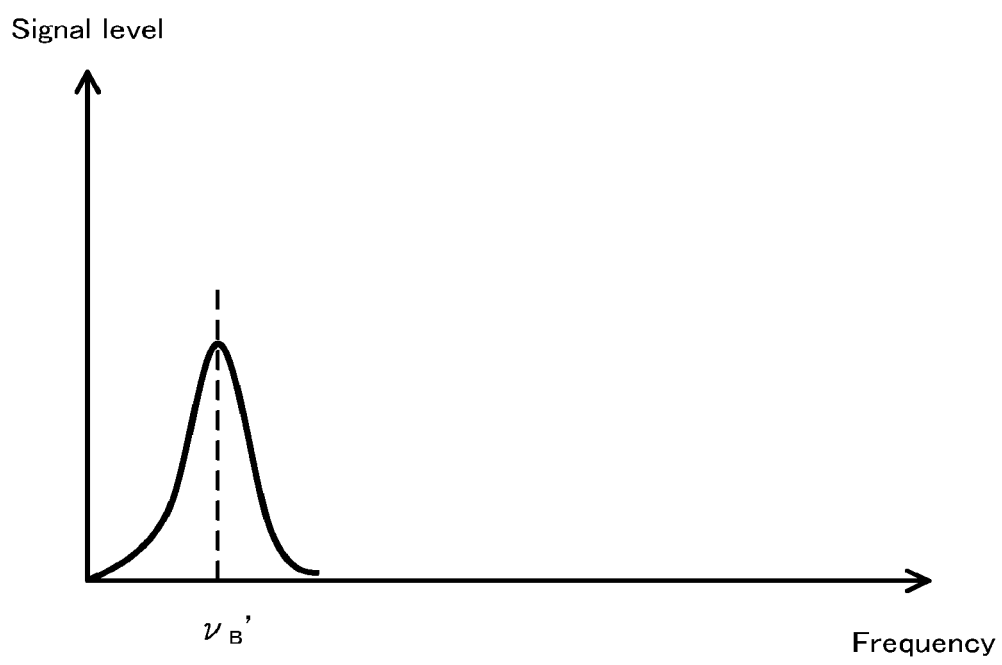
FIG. 8 shows an example of a reference frequency signal stored in a storage part 190 according to the present embodiment.

FIG. 8 shows an example of the reference frequency signal stored in the storage part 190 according to the present embodiment. In FIG. 8, the horizontal axis indicates the frequency and the vertical axis indicates the signal level. The storage part 190 stores, as the reference frequency signal, the frequency signal of the reference signal as shown in FIG. 8.

Then, the frequency analyzing part 160 subtracts the signal level of the reference frequency signal from the signal level of the frequency signal converted from the beat signal, for each frequency, and then specifies the frequency of the beat signal. The frequency analyzing part 160 subtracts the reference frequency signal shown in FIG. 8 from the distance measurement signal shown in FIG. 7, for example.

Figure 9:
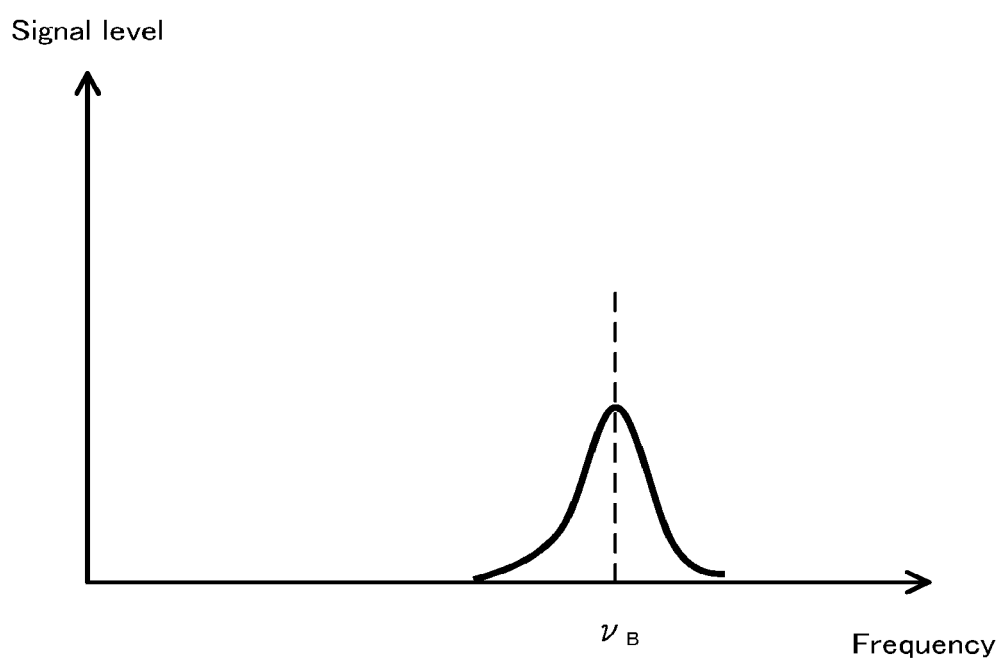
FIG. 9 shows an example of a result of the frequency analyzing part 160 according to the present embodiment subtracting the reference frequency signal from a signal for measuring distance.

FIG. 9 shows an example of a result of the frequency analyzing part 160 according to the present embodiment subtracting the reference frequency signal from the distance measurement signal. In FIG. 9, the horizontal axis indicates the frequency of the light and the vertical axis indicates the signal level. From FIG. 9, it can be seen that the frequency spectrum of the reference beat signal based on the end-face reflected light is subtracted from the frequency signal in which the two frequency spectra are superposed. By doing this, the frequency analyzing part 160 can analyze the frequency spectrum of the beat signal based on the reflected light reflected on the object to be measured 10 and output the frequency $v_B(m, d)$ of the beat signal.

Then, the calculation part 170 calculates a difference d between propagation distances of the reference light and the measurement light with Equation 6, using the frequency $v_B(m, d)$ of the beat signal obtained by the frequency analyzing part 160 performing the frequency analysis on the beat signal. As described above, since the signal level of the reference frequency signal is subtracted from the signal level of the distance measurement signal output by the beat signal generation part 150, the measurement apparatus 100 according to the present embodiment can reduce influences of the end-face reflected light occurring at the laser beam exit end on the distance measurement result.

For example, the distance d from the optical head part 140 to the object to be measured 10 can be measured by reducing the occurrence of the frequency analyzing part 160 processing the reference beat signal based on the end-face reflected light as the beat signal to be analyzed. Also, even if (i) the peak of the frequency spectrum of the beat signal based on the reflected light reflected on the object to be measured 10 and (ii) the peak of the frequency spectrum of the reference beat signal are superposed closely to the extent that they cannot be separated, the measurement apparatus 100 subtracts the frequency spectrum of the reference beat signal from the superposed light spectra. By doing this, the measurement apparatus 100 can analyze the frequency spectrum of the beat signal based on the reflected light reflected on the object to be measured 10 and measure the distance d with good accuracy.

[Variation Example of the Measurement Apparatus 100]

Cases where the measurement apparatus 100 according to the present embodiment stores, as the reference frequency signal, the signal obtained by converting the reference signal output by the beat signal generation part 150 in the state without the object to be measured 10 into the frequency signal have been described above. Here, the measurement apparatus 100 may be configured to be easily switched between a state where the frequency-modulated laser beam irradiates the object to be measured 10 and a state where the frequency-modulated laser beam does not irradiate the object to be measured 10. Next, such a measurement apparatus 100 will be described.

Figure 10:
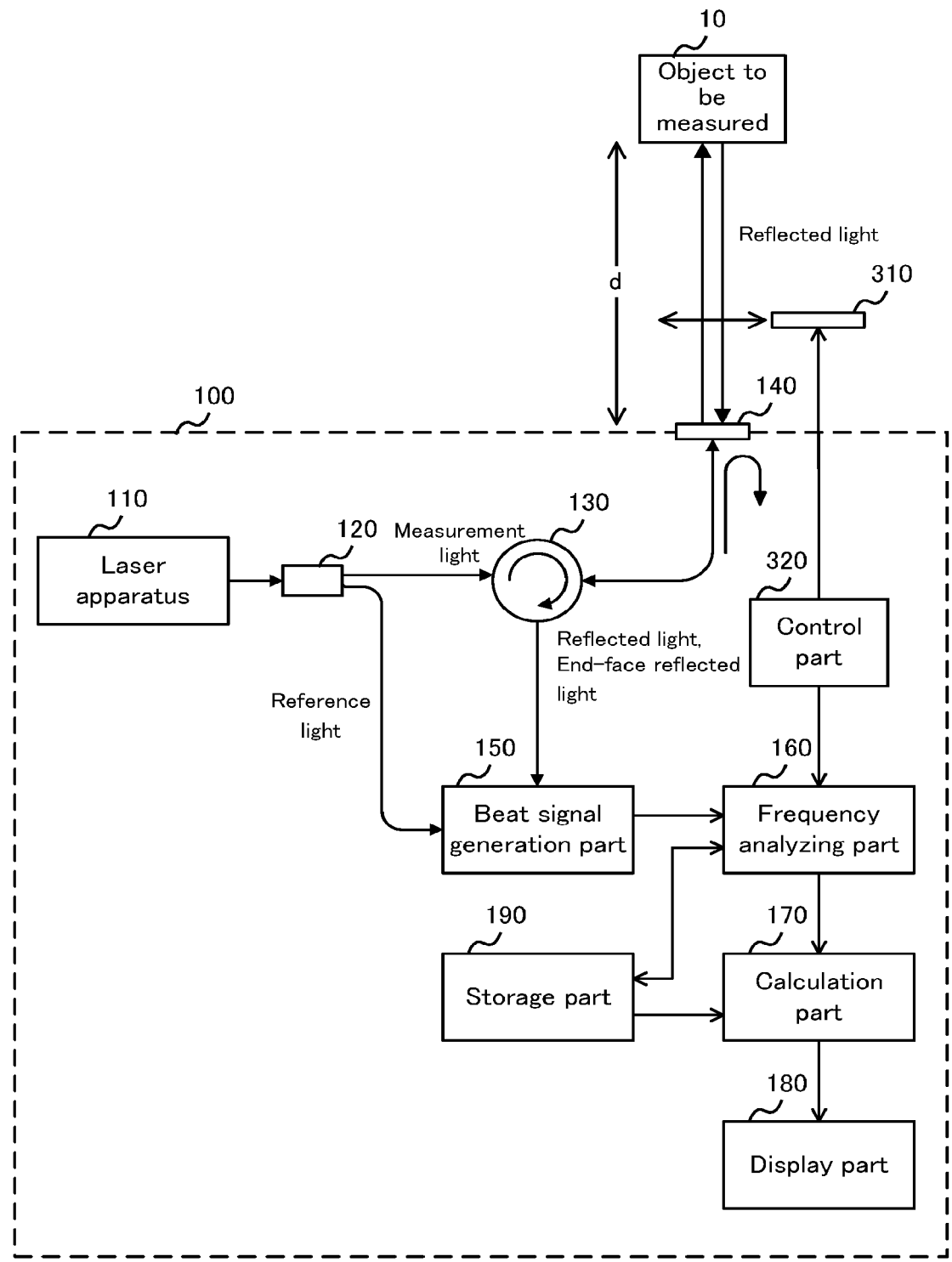
FIG. 10 shows a variation example of the measurement apparatus 100 according to the present embodiment together with the object to be measured 10.

FIG. 10 shows a variation example of the measurement apparatus 100 according to the present embodiment together with the object to be measured 10. In the measurement apparatus 100 according to the variation example, operations approximately the same as those of the measurement apparatus 100 according to the present embodiment shown in FIG. 1 are denoted by the same reference numerals, and the descriptions thereof are omitted. The measurement apparatus 100 of the variation example further includes a shutter part 310 and a control part 320.

The shutter part 310 is provided between the exit end face that emits the measurement light and the object to be measured 10, and makes it possible to shut off the irradiation of the measurement light from the exit end face to the object to be measured 10. For example, when an arrangement of an optical system, i.e., the measurement apparatus 100 and the object to be measured 10, is completed, the measurement light can be radiated onto the object to be measured 10 when the shutter part 310 is opened and the measurement light is shut off and cannot be radiated onto the object to be measured 10 when the shutter part 310 is closed.

The shutter part 310 may be provided between the optical head part 140 and the object to be measured 10, or instead may be provided in the optical head part 140. In the shutter part 310, a plate member for shutting off the measurement light is movably provided, for example. In this case, by moving the plate member on the optical axis of the measurement light, the shutter part 310 enters a closed state.

The control part 320 controls the shutter part 310 to radiate the measurement light onto the object to be measured 10 by opening the shutter part 310 when calculating the difference d between the propagation distances of the reference light and the measurement light. By doing this, the frequency signal, which is a signal output by the beat signal generation part 150 and converted by the frequency analyzing part 160 into a frequency domain signal, becomes the distance measurement signal when the end-face reflected light has occurred. Further, the control part 320 closes the shutter part 310 to shut off the measurement light when obtaining the reference frequency signal. By doing this, the frequency signal, which is a signal output by the beat signal generation part 150 and converted by the frequency analyzing part 160 into a frequency domain signal, becomes the reference frequency signal when the end-face reflected light has occurred.

When the shutter part 310 is closed, the control part 320 controls the frequency analyzing part 160 to store the reference frequency signal, which is the reference beat signal frequency-converted by the frequency analyzing part 160 to the storage part 190, for example. Further, when the shutter part 310 is opened, the control part 320 controls the frequency analyzing part 160 to read the reference frequency signal from the storage part 190 and then frequency-analyze a frequency signal obtained by subtracting the reference frequency signal from the distance measurement signal, for example.

In this manner, the measurement apparatus 100 of the above variation example can easily switch between a state where the measurement light does not irradiate the object to be measured 10 and a state where the measurement light irradiates the object to be measured 10, without moving the measurement apparatus 100 or the object to be measured 10. Therefore, the measurement apparatus 100 can quickly measure the distance d between the optical head part 140 and the object to be measured 10 even if the end-face reflected light occurs.

The control part 320 includes the FPGA, the DSP, and/or the CPU in a similar manner as with the frequency analyzing part 160 and the calculation part 170, for example. It should be noted that the frequency analyzing part 160, the calculation part 170, and the control part 320 may be configured with one CPU.

Constants and the like of the respective parts forming the measurement apparatus 100 may change according to environmental changes, and may also change over time. For example, the length of the optical fiber, the arrangement of optical components, circuit constants of electronic circuit elements, and the like may change both environmentally and over time. In this case, the frequency of the reference beat signal based on the end-face reflected light may change in response to the changes in the constants of the internal parts of the measurement apparatus 100.

In this case, the reference frequency signal stored in the storage part 190 is the frequency signal of the reference beat signal prior to the change. Therefore, there may be a case where a shape of a frequency spectrum of the frequency signal obtained by subtracting the signal level of the reference frequency signal stored in the storage part 190 from the signal level of the distance measurement signal differs from a shape of the frequency spectrum of the beat signal based on the reflected light which is reflected on the object to be measured 10. In this case, the measurement apparatus 100 cannot accurately measure the distance d between the optical head part 140 and the object to be measured 10.

Therefore, the control part 320 of the present variation example shuts off the measurement light by closing the shutter part 310 in response to the passing of a predetermined time, stores the frequency domain signal converted by the frequency analyzing part 160 in the storage part 190, and updates the reference frequency signal. By doing this, even if the reference frequency signal is changed due to the environmental changes and/or change over time, the measurement apparatus 100 can suppress the reduction in measurement accuracy by updating the reference frequency signal stored in the storage part 190.

It should be noted that the measurement apparatus 100 may be further provided with an accepting unit for accepting an execution of the update of the reference frequency signal from the user. When the accepting unit accepts the update of the reference frequency signal, the measurement apparatus 100 updates the reference frequency signal. By doing this, the user can update the reference frequency signal at his/her intended timing, and therefore it is possible to suppress the reduction in measurement accuracy even if a sudden environmental change occurs, for example.

In the measurement apparatus 100 of the present variation example described above, cases where the shutter part 310 is provided such that the measurement light can be shut off have been described, but it is not limited to this. For example, instead of the shutter part 310, a mirror or the like for changing an optical path of the measurement light may be movably provided. Further, a filter or the like for reducing the light intensity of the measurement light may be movably provided.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments of the present disclosure. Further, effects of the new embodiment brought by the combinations also have the effect of the original exemplary embodiment together.

What is claimed is:

1. A measurement apparatus comprising:
    a laser apparatus that outputs a frequency-modulated laser beam;
    a branching part that splits the frequency-modulated laser beam output by the laser apparatus such that a portion of the frequency-modulated laser beam is a reference light and at least some of the remaining portion of the frequency-modulated laser beam is a measurement light;
    a beat signal generation part that generates a beat signal by mixing the reference light and a reflected light that is reflected by radiating the measurement light onto an object to be measured;
    a frequency analyzing part that performs a frequency analysis on the beat signal;
    a storage part that stores a reference frequency signal, which is a reference signal output by the beat signal generation part in a state without the object to be measured and converted into a frequency signal; and
    a calculation part that calculates a difference between propagation distances of the reference light and the measurement light based on a result of the frequency analysis performed on the beat signal by the frequency analyzing part, wherein
    the frequency analyzing part subtracts a signal level of the reference frequency signal from a signal level of a frequency signal converted from the beat signal, for each frequency, and then specifies a frequency of the beat signal.

2. The measurement apparatus according to claim 1, wherein the beat signal generation part outputs, as the reference signal, a signal including a reference beat signal generated by mixing the reference light and an end-face reflected light reflected from an exit end face that emits the measurement light.

3. The measurement apparatus according to claim 2, wherein the beat signal generation part generates two beat signals, which are (i) a first beat signal due to the reflected light of the measurement light and the reference light and (ii) a second beat signal due to the end-face reflected light and the reference light,
    the frequency analyzing part outputs, as a distance measurement signal, a signal which is obtained by converting a signal in which the two beat signals generated by the beat signal generation part are superposed into a frequency domain signal, and
    the frequency analyzing part subtracts a frequency spectrum of the reference beat signal based on the end-face reflected light from a frequency spectrum of the distance measurement signal by subtracting a signal level of the reference frequency signal from a signal level of the distance measurement signal for each frequency.

4. The measurement apparatus according to claim 2, further comprising:
    a shutter part provided between the exit end face and the object to be measured and capable of shutting off radiation of the measurement light from the exit end face to the object to be measured; and
    a control part that controls the shutter part to radiate the measurement light onto the object to be measured by opening the shutter part when calculating a difference between propagation distances of the reference light and the measurement light and to shut off the measurement light by closing the shutter part when obtaining the reference frequency signal.

5. The measurement apparatus according to claim 4, wherein the control part closes the shutter part to shut off the measurement light in response to a passing of a predetermined time, stores the frequency domain signal converted by the frequency analyzing part in the storage part, and updates the reference frequency signal.

6. The measurement apparatus according to claim 2, further comprising:
    a mirror, provided between the exit end face and the object to be measured, that is capable of changing an optical path of the measurement light which is radiated form the exit end face onto the object to be measured; and
    a control part that controls the mirror to change a position of the mirror such that the measurement light irradiates the object to be measured when calculating a difference between propagation distances of the reference light and the measurement light, and to change the position of the mirror such that the optical path of the measurement light changes when obtaining the reference frequency signal.

7. The measurement apparatus according to claim 1, wherein the calculation part calculates a difference d between propagation distances of the reference light and the measurement light by the following equation, using a frequency $v_B(m, d)$ of the beat signal obtained by the frequency analyzing part performing a frequency analysis on the beat signal, $$d = \frac{c}{2v_s v_c} \{v_B(m, d) + mv_c\} \quad (1)$$

where c is the speed of light, $v_s$, is a frequency shift amount of the frequency-modulated laser beam, $v_C$ is $1/\tau_{RT}$, $\tau_{RT}$ is the time for light to go around a cavity of the laser apparatus once, and m is an interval of the longitudinal mode numbers of the frequency-modulated laser beam, that is difference between the longitudinal mode numbers of the measurement light and the longitudinal mode numbers of the reference light.

8. A measurement method of a measurement apparatus for measuring a distance to an object to be measured, the method comprising:
    outputting a frequency-modulated laser beam;
    splitting the frequency-modulated laser beam such that a portion of the frequency-modulated laser beam is a reference light and at least some of the remaining portion of the frequency-modulated laser beam is a measurement light;

outputting, as a reference signal, a signal including a reference beat signal obtained by mixing the reference light and an end-face reflected light reflected from an exit end face that emits the measurement light in a state without the object to be measured;

storing information obtained by converting the reference signal into a frequency signal, as a reference frequency signal;

generating a plurality of beat signals by mixing the reference light and a reflected light that is reflected by radiating the measurement light onto the object to be measured;

performing a frequency analysis on a frequency signal obtained by subtracting, for each frequency, a signal level of the reference frequency signal from a signal level of frequency signals which are converted from the beat signals into frequency domain signals; and calculating a difference between propagation distances of the reference light and the measurement light based on a result of the frequency analysis.

9. A measurement apparatus comprising:

a laser that outputs a frequency-modulated laser beam;

a splitter that splits the frequency-modulated laser beam output by the laser such that a portion of the frequency-modulated laser beam is a reference light and at least some of the remaining portion of the frequency-modulated laser beam is a measurement light;

a beat signal generator that generates a beat signal by mixing the reference light and a reflected light that is reflected by radiating the measurement light onto an object to be measured;

a frequency analyzer that performs a frequency analysis on the beat signal;

a non-transitory memory that stores a reference frequency signal, which is a reference signal output by the beat signal generator in a state without the object to be measured and converted into a frequency signal; and calculation circuitry configured to calculate a difference between propagation distances of the reference light and the measurement light based on a result of the frequency analysis performed on the beat signal by the frequency analyzer, wherein the frequency analyzer subtracts a signal level of the reference frequency signal from a signal level of a frequency signal converted from the beat signal, for each frequency, and then specifies a frequency of the beat signal.

* * * * *